United States Patent
Guy

(12) United States Patent (10) Patent No.: US 6,872,013 B2
Guy (45) Date of Patent: Mar. 29, 2005

(54) IRIS WITH INTEGRATED DRIVE MOTOR

(75) Inventor: James K. Guy, Mesa, AZ (US)

(73) Assignee: The Boeing Company, Chicago, IL (US)

( * ) Notice: Subject to any disclaimer, the term of this patent is extended or adjusted under 35 U.S.C. 154(b) by 21 days.

(21) Appl. No.: 10/022,881

(22) Filed: Dec. 13, 2001

(65) Prior Publication Data

US 2003/0113111 A1 Jun. 19, 2003

(51) Int. Cl.⁷ ............................................. G03B 9/02
(52) U.S. Cl. ...................................... 396/508; 396/510
(58) Field of Search ............................... 396/506, 508, 396/510

(56) References Cited

U.S. PATENT DOCUMENTS

| | | | | |
|---|---|---|---|---|
| 3,876,008 A | * | 4/1975 | Scruggs ........................ | 169/18 |
| 4,034,949 A | * | 7/1977 | Hoesterey et al. ......... | 244/3.16 |
| 4,050,085 A | * | 9/1977 | Prince et al. ............. | 348/217.1 |
| 4,378,146 A | * | 3/1983 | Suzuki et al. ............... | 359/230 |
| 4,491,401 A | * | 1/1985 | Inaba et al. ................. | 396/508 |
| 4,588,276 A | | 5/1986 | Kaise | |
| 4,605,286 A | * | 8/1986 | Sumi ........................... | 359/696 |
| 4,778,255 A | * | 10/1988 | Fujiwara et al. ............ | 359/230 |
| 4,790,194 A | * | 12/1988 | Bellows et al. ........... | 73/861.53 |
| 4,952,859 A | * | 8/1990 | Torisawa et al. ........... | 396/508 |
| 5,140,212 A | * | 8/1992 | Iwasaki et al. ............. | 310/191 |
| 5,955,806 A | * | 9/1999 | Devenyi ................ | 310/156.26 |
| 6,323,575 B1 | * | 11/2001 | Devenyi ...................... | 310/266 |

* cited by examiner

Primary Examiner—Christopher Mahoney
(74) Attorney, Agent, or Firm—Artz & Artz, PC

(57) ABSTRACT

An iris includes a stator assembly having a frame coupled to an electrically wound, substantially annular magnetic core. The iris further includes a rotor, which is rotatably coupled to the magnetic core such that a channel is defined. A diaphragm, having a plurality of diaphragm leaves, is coupled to the stator assembly. The diaphragm leaves are pivotally arranged to form an adjustable aperture, which is substantially concentric with the channel. A portion of at least one of the diaphragm leaves is coupled to the stator assembly, and another portion of at least one of the plurality of diaphragm leaves is coupled to the rotor.

16 Claims, 2 Drawing Sheets

US 6,872,013 B2

IRIS WITH INTEGRATED DRIVE MOTOR

TECHNICAL FIELD

The present invention relates generally to irises, and more particularly, to a mechanical iris with an integrated drive motor.

BACKGROUND ART

It is well known in the field of optics that drive motors, such as stepper and servo motors, are coupled to gear-trains or belts, which drive iris diaphragms.

Stepper motors are electromagnetic devices designed to convert a series of input power pulses into discrete angular movements. Stepper motors are, however, also capable of continuous rotation. In contrast, servomotors are alternating current (AC) induction motors with electrically wound magnetic cores and low-inertia high-resistance rotors. Servomotors are designed for use in feedback control systems and for operation with applied continuous voltages.

Typically, an iris diaphragm is mounted in a camera or a telescope to restrict entry of light. Examples of cameras are still cameras, movie cameras, camcorders and the like. When taking a picture of an object, for example, it is necessary to control the opening and closing of the iris diaphragm in accordance with the magnitude of the luminance signal received therein. In other words, the larger the magnitude of the luminance signal, the smaller the aperture of the iris diaphragm required. Alternately, the smaller the magnitude of the luminance signal, the larger the aperture of the iris diaphragm required.

The drive motor drives the iris diaphragm to vary the size of the iris aperture. The drive motor operates in response to signals received from a motor control circuit. In order to generate signals to adjust the iris, the controller compares, for example, light from a scene being viewed by a telescope to a predetermined standard. When a difference exists between the light passing through the iris and the predetermined standard, a control signal is provided to the motor control circuit to generate a signal to drive the iris drive motor.

Gears are well understood components of many drive systems that tend to have inherent drawbacks. For example, friction, caused by loads, reduces efficiency. Contamination of other drive system components occurs from lubricant, which is used to reduce friction. Nonlubricated non-metal gears also contaminate drive systems through particulates, which are created from component wear.

An example of a current drive device for an iris diaphragm in an optical system includes a drive motor with a spur gear having a relative gear ratio to the gear teeth on the iris diaphragm. The rotor portion of the drive motor, connected either directly to the spur gear or to a spiral rail on which the spur gear moves, rotates in response to the iris control system.

The aforementioned examples require gear reductions between the rotor and the diaphragm. Fewer gear reductions would substantially decrease part count and potential drive system complexity.

An alternate example of a current automatic control device for controlling an iris diaphragm is a system through which the motor drives a belt, which drives the diaphragm. This design is, however, subject to belt wear, which can interfere with motor to diaphragm torque transfer efficiency.

Another known, adjustable iris system includes a manually adjustable iris, wherein the operator manually adjusts the opening of the iris in order to set the intensity of light received. Manual adjustment is, however, time consuming and difficult to calibrate.

In addition to the aforementioned, proper sizing of the drive motor is critical. The drive motor must be of sufficient size to avoid stall conditions and sufficiently scaled to avoid large vibration interference in the motor and to fit into product space requirements. A first major difficulty encountered through motor undersizing is that the torque on the iris, as it closes, approaches a value (i.e. infinity) at which the blades deform or tear. A second major difficulty encountered through motor undersizing is that the moment of inertia of the iris ring is substantial. A third major difficulty encountered through motor undersizing is that the gear-train requires a high gear ratio to drive the iris.

The disadvantages associated with current iris drive techniques have made it apparent that a new technique to drive iris diaphragms is needed. The new technique should substantially reduce part count, particularly the required number of gears, and should minimize the space occupied by the drive motor and the iris without impairing functionality. The present invention is directed to these ends.

SUMMARY OF THE INVENTION

The present invention provides an integrated drive motor and iris system. The present invention also provides a system that substantially eliminates gear reductions between the drive motor and the iris.

In accordance with the present invention, an iris, which includes a stator assembly having a frame coupled to an electrically wound, substantially annular magnetic core, is disclosed. The iris further includes a rotor, which is rotatably coupled to the magnetic core such that a channel is defined. A diaphragm, having a plurality of diaphragm leaves, is coupled to the stator assembly. The diaphragm leaves are pivotally arranged to form an adjustable aperture, which is substantially concentric with the channel. A portion of at least one of the diaphragm leaves is coupled to the stator assembly, and another portion of at least one of the plurality of diaphragm leaves is coupled to the rotor.

An advantage of the present invention is that it eliminates the need for a gear train between the drive motor and iris. Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

DETAILED DESCRIPTION OF THE INVENTION

The present invention is illustrated with respect to an integrated drive motor and iris system, particularly suited to the field of optics. The present invention is, however, applicable to various other uses that may require an adjustable iris, as will be understood by one skilled in the art.

Figure 1:
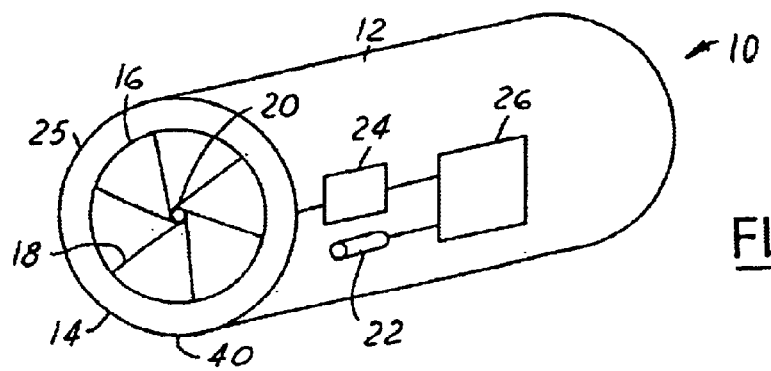
FIG. 1 depicts a perspective view of an iris with an integrated drive motor in accordance with one embodiment of the present invention.

Referring to FIG. 1, an iris system 10, in accordance with the present invention, is illustrated. The system 10 includes an iris holder or body 12, here represented as a cylindrical frame, such as that of a telescope, coupled to an iris 14. The iris 14, which will be discussed later in detail, includes a diaphragm 16 having a plurality of diaphragm leaves 18 arranged to form an adjustable aperture 20. A sensor 22 is coupled to the body 12 for detecting aperture diameter requirement data. An actuator 24, which increases and decreases aperture diameter through activation of a drive motor 25 (integrated with the iris 14), is also coupled to the body 12. A controller 26 is further coupled to the body 12 and is adapted to receive data from the sensor 22. The controller 26 contains logic programmed to activate the actuator 24 in response to sensor data.

Figure 2:
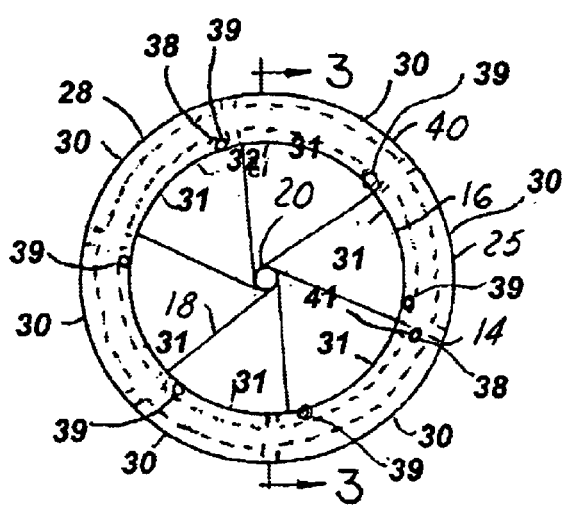
FIGS. 2, 2a, and 2b illustrates a frontal view of the iris with integrated drive motor of FIG. 1.
Figure 3:
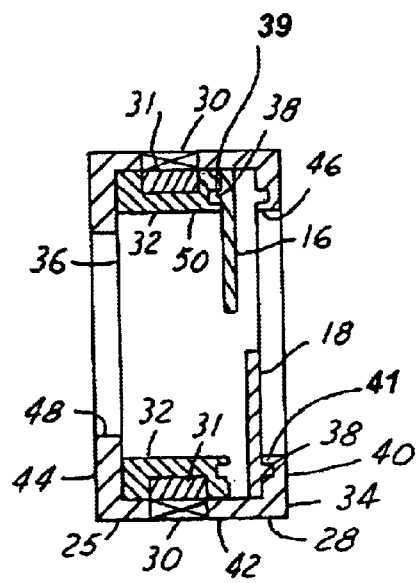
FIG. 3 illustrates a sectional view of FIG. 2 in the direction of line 3—3.
Figure 4:
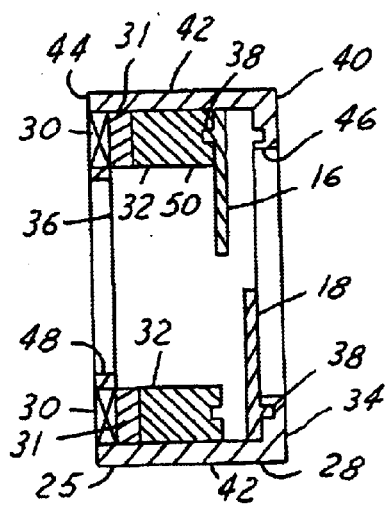
FIG. 4 illustrates a sectional view similar to that of FIG. 3 in accordance with another embodiment of the present invention.

Referring to FIGS. 2, 3 and 4, an iris 14, including the drive motor 25 integrated with the iris diaphragm 16, is illustrated. The drive motor 25 has a stator assembly 28, with an electrically wound magnetic core 30, and a rotor 32.

The iris diaphragm 16, which is coupled to the stator assembly 28, includes the plurality of diaphragm leaves 18 pivotally arranged and adapted to rotate to form an adjustable aperture 20. The rotor 32 is coupled to a portion of each of the plurality of diaphragm leaves 18 and is rotatably coupled to the stator assembly magnetic core 30, such that a channel 36 is defined. The channel 36 is substantially concentric with the aperture 20.

The body 12 is illustrated as a telescope case and is alternately embodied as a camera case, pipe or tube or other structure requiring restriction of flow of either light or a material substance. Material substances may include water or other substantially fluid material flowing wherein restriction of passage into or through the body 12 is desired.

Figure 2A:
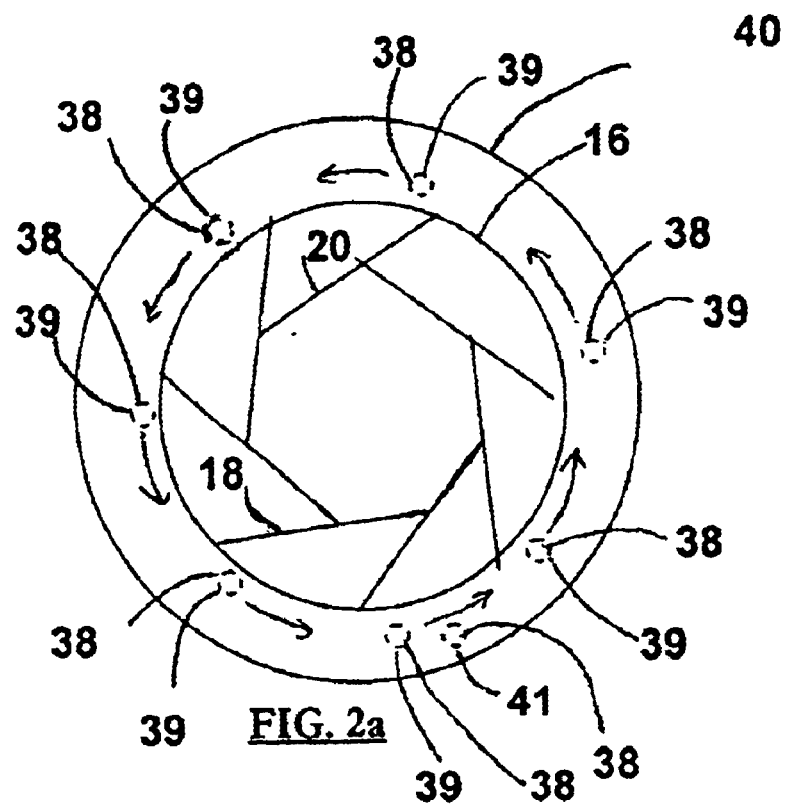
Figure 2B:
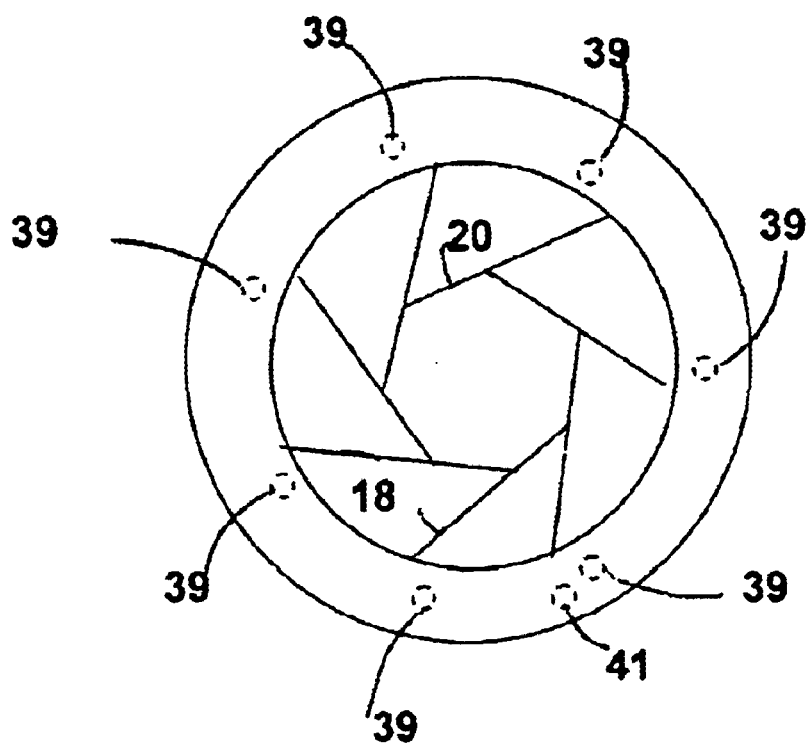

The iris drive mechanism includes a drive source (drive motor 25) in the form of an annular electric servomotor. It is to be understood, however, that various motor types (e.g. stepper motors) may be used to rotate the diaphragm 16. The illustrated motor 25 has both a moving section, rotor 32, and a stationary section, stator assembly 28. The iris drive motor 25 is disposed in the optical axis of the optical system (iris system 10). The drive motor 25 responds to a signal from the sensor 22 (here illustrated as a photometer), as will be discussed later, and rotates the rotor 32 to operate the iris diaphragm 16, which is illustrated in a first state of opening in FIG. 2a and a second state of opening in FIG. 2b.

The stator assembly 28, which is embodied as a first annular member, is attached to the body 12 and is structurally an annular frame 34 coupled to electrically wound magnetic core 30, as will be understood by one skilled in the art. The magnetic core 30 is electrically connected, through wires, to an AC power source within the actuator 24.

The stator assembly frame 34 is embodied with a first annular element 40 circumjacent at one end of a sidewall 42. A second annular element 44 is circumjacent to the sidewall 42 at another end of the sidewall 42. The first annular element 40 has a first opening 46, and the second annular element 44 has a second opening 48 such that a channel (first channel) is defined through the frame 34.

The electrically wound magnetic core 30 is illustrated as coupled to the sidewall 42 in FIG. 3, however, FIG. 4 illustrates the electrically wound magnetic core 30 coupled to the second annular element 44. One skilled in the art will understand that numerous alternate positions of the electrically wound magnetic core 30 are within the scope of the present invention. The electrically wound magnetic core 30 includes a plurality of electro-magnets.

The rotor 32 is embodied as a second annular member including a second frame 50 coupled to a plurality of permanent magnets 31 (second magnetic core). Both the rotor 32 and stator assembly 28 are rotatably attached to a portion of each of the plurality of diaphragm leaves 18 through pivot pins 38. The pivot pins 38 are ideally placed such that a first pin 39 on at least a portion of the leaves attaches to the rotor 32 and a second pin 41 on the alternate side of at least one of the leaves (this leaf is different than the leaf including the first pin) attaches to the stator assembly frame 34, as will be understood by one skilled in the art. Important to note is that while the rotor moves, the second pin 41 remains stationary relative to the stator. The rotor 32 is also rotatably coupled to the magnetic core 30, whereby a second channel is defined. The channels defined by the annular rotor 32 and the annular stator 28 are substantially concentric such that a single channel 36 represents the individual channels.

The rotor 32 moves in response to a magnetic field created in the stator 28 from AC currents carried in the magnetic core windings provided from the AC power source in the actuator 24. Magnetic forces in the rotor 32 tend to follow the magnetic fields of the stator 28 to trigger rotary motion.

All motors have an internal rotor moment of inertia, which affects the overall system inertia when starting, stopping, or stalling the motor. The rotor inertia in the current invention is the main system inertia, which simplifies torque calculations and substantially eliminates gear reduction between the drive motor 25 and the iris diaphragm 16.

The iris diaphragm 16 is illustrated with six semi-circular leaves 18, however, numerous numbers and shape of leaves would function well in the current embodiment, as will be understood by one skilled in the art. The iris diaphragm 16 is coupled to both the stator assembly 28 and the rotor 32 through the pivot pins 38. The rotor 32 rotates to increase and decrease the aperture diameter, as will be understood by one skilled in the art.

The sensor 22 is coupled to the body 12 for detecting aperture diameter requirement data. The sensor 22 is illustrated as a photo-sensor that receives data based on the amount of light present. Alternate embodiments, such as in the case of fluid restriction systems, require sensors that detect the amount of flowing matter.

The actuator 24, in the form of an AC motor with wires connecting it to the stator assembly 28 and a power source, is also coupled to the body 12. The actuator 24 is adapted to send electrical current through windings on the electrically wound magnetic core 30 such that the rotor 32 rotates in response to the electrical current.

The controller 26 is also attached to the body 12 and is adapted to receive data from the sensor 22. The controller 26 contains logic designed to activate the actuator 24 in response to the data, as will be understood by one skilled in the art.

An illustrative example of the iris system 10, in operation, starts with the iris 14 exposed to light. If the amount of light received in the sensor 22 is equivalent to the necessary amount of light, the aperture 20 remains unchanged. Otherwise, the controller 26 activates, and the amount of light received is compared to the predetermined desired amount of light. Logic, familiar to one skilled in the art and operating within the controller 26, subsequently commands the controller 26 to send a signal to the actuator to rotate the rotor 32.

From the foregoing, it can be seen that there has been brought to the art a new and improved iris system 10. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims.

What is claimed is:

1. An iris, comprising:
   a stator assembly comprising a frame coupled to an electrically wound substantially annular magnetic core;
   a rotor rotatably coupled to said substantially annular magnetic core and defining a channel, said rotor comprising an annular member comprising an upper surface and a lower surface and a common edge, said rotor further comprising a plurality of magnets coupled to said upper surface, said annular member defining at least one opening in said lower surface; and
   a diaphragm coupled to said stator assembly comprising a plurality of diaphragm leaves pivotally arranged to form an adjustable aperture substantially concentric with said channel; a first portion of at least one of said plurality of diaphragm leaves extending from said diaphragm and coupled to said stator, a second portion of another of said plurality of diaphragm leaves extending from said diaphragm and coupled to said rotor such that said second portion fits within said at least one opening.

2. The iris of claim 1 further comprising a body coupled to said stator assembly.

3. The iris of claim 2 further comprising a sensor coupled to said body for detecting aperture diameter data.

4. The iris of claim 3 further comprising an actuator coupled to said body, said actuator adapted to provide electrical current through winding, on said electrically wound magnetic core such that said rotor rotates in response to said electrical current.

5. The iris of claim 4 further comprising a controller coupled to said body adapted to receive data from said sensor, said controller containing logic designed to activate said actuator in response to said data.

6. An iris system comprising:
   a first annular member comprising a first frame coupled to a first magnetic core, said first frame comprising a sidewall, a first annular element circumjacent at one end of said sidewall, a second annular element circumjacent at another end of said sidewall, said first annular element having a first opening, said second annular element having a second opening such that a first channel is defined through said first frame;
   a second annular member comprising a second frame coupled to a second magnetic core juxtaposing said first magnetic core, said second annular member rotatably coupled to said first annular member such that a second channel is defined substantially concentric with said first channel, said second annular member further comprising an annular member comprising an upper surface and a lower surface and a common edge, wherein said second magnetic core is coupled to said upper surface and at least one opening is defined in said lower surface; and
   a plurality of leaves adapted to rotate to form an adjustable aperture substantially concentric with said first channel, a first portion of a first leaf of said plurality of leaves extending from said plurality of leaves and rotatably coupled to said first annular element of said first annular member, a second portion of a second leaf of said plurality of leaves extending from said plurality of leaves and rotatably coupled to said second annular member such that said second portion fits within said at least one opening.

7. The iris of claim 6 further comprising a body coupled to said first annular member.

8. The iris of claim 7 further comprising a sensor coupled to said body for detecting aperture diameter data.

9. The iris of claim 8 further comprising an actuator coupled to said body, said actuator adapted to send electrical current through windings on said first magnetic core such that said second annular member rotates in response to said electrical current.

10. The iris of claim 9 further comprising a controller coupled to said body adapted to receive data from said sensor, said controller containing logic designed to activate said actuator in response to said data.

11. The system of claim 6 wherein said first magnetic core is coupled to said sidewall.

12. The system of claim 6 wherein said first magnetic core is coupled to said second annular element.

13. An iris system, comprising:
   a body;
   a stator assembly, coupled to said body, comprising a frame coupled to an electrically wound substantially annular magnetic core;
   a rotor rotatably coupled to said substantially annular magnetic core, such that a channel is defined, said rotor comprising an annular member comprising an upper surface and a lower surface and a common edge, said rotor further comprising a plurality of magnets coupled to said upper surface, said annular member defining at least one opening in said lower surface;
   a diaphragm coupled to said stator assembly comprising a plurality of diaphragm leaves pivotally arranged to form an adjustable aperture substantially concentric with said channel; a first portion of at least one of said plurality of diaphragm leaves extending from said diaphragm and coupled to said stator, a second portion of another of said plurality of diaphragm leaves extending from said diaphragm and coupled to said rotor such that said second portion fits within said at least one opening;
   a sensor coupled to said body for detecting aperture diameter data;
   an actuator coupled to said body, said actuator adapted to provide electrical current through windings on said electrically wound magnetic core such that said rotor rotates in response to said electrical current; and
   a controller coupled to said body and adapted to receive data from said sensor, said controller containing logic adapted to activate said actuator in response to said data.

14. The iris of claim 13 wherein said body comprises a telescope.

15. The iris of claim 13 wherein said comprises a camera.

16. The iris of claim 13 wherein said body comprises a pipe.

* * * * *

UNITED STATES PATENT AND TRADEMARK OFFICE
CERTIFICATE OF CORRECTION

PATENT NO. : 6,872,013 B2
DATED : March 29, 2005
INVENTOR(S) : James K. Guy

It is certified that error appears in the above-identified patent and that said Letters Patent is hereby corrected as shown below:

Column 5,
Line 37, delete "winding" and insert -- windings --.

Signed and Sealed this

Sixth Day of December, 2005

JON W. DUDAS
*Director of the United States Patent and Trademark Office*